(No Model.)

A. T. CULBERTSON.
HEDGE FENCE.

No. 393,096. Patented Nov. 20, 1888.

Witnesses

Inventor,
Arthur T. Culbertson

UNITED STATES PATENT OFFICE.

ARTHUR T. CULBERTSON, OF TROY, OHIO.

HEDGE FENCE.

SPECIFICATION forming part of Letters Patent No. 393,096, dated November 20, 1888.

Application filed April 21, 1888. Serial No. 271,460. (No model.)

*To all whom it may concern:*

Be it known that I, ARTHUR T. CULBERTSON, a citizen of the United States, residing at Troy, in the county of Miami and State of Ohio, have invented certain new and useful Improvements in Hedge Fences, of which the following is a specification.

My invention relates to hedge fences; and it particularly relates to the manner of plashing the same and securing the stalks together.

My invention consists in planting the plants to form the hedge in two rows, and when sufficiently developed trimming the canes and bending them in opposite directions in the line of the fence, so that the canes of the respective rows shall cross at various places, the said canes being secured at the points of intersection by means of clamping-rings of a novel construction, whereby the use of sustaining-wires may be dispensed with.

Figure 1:
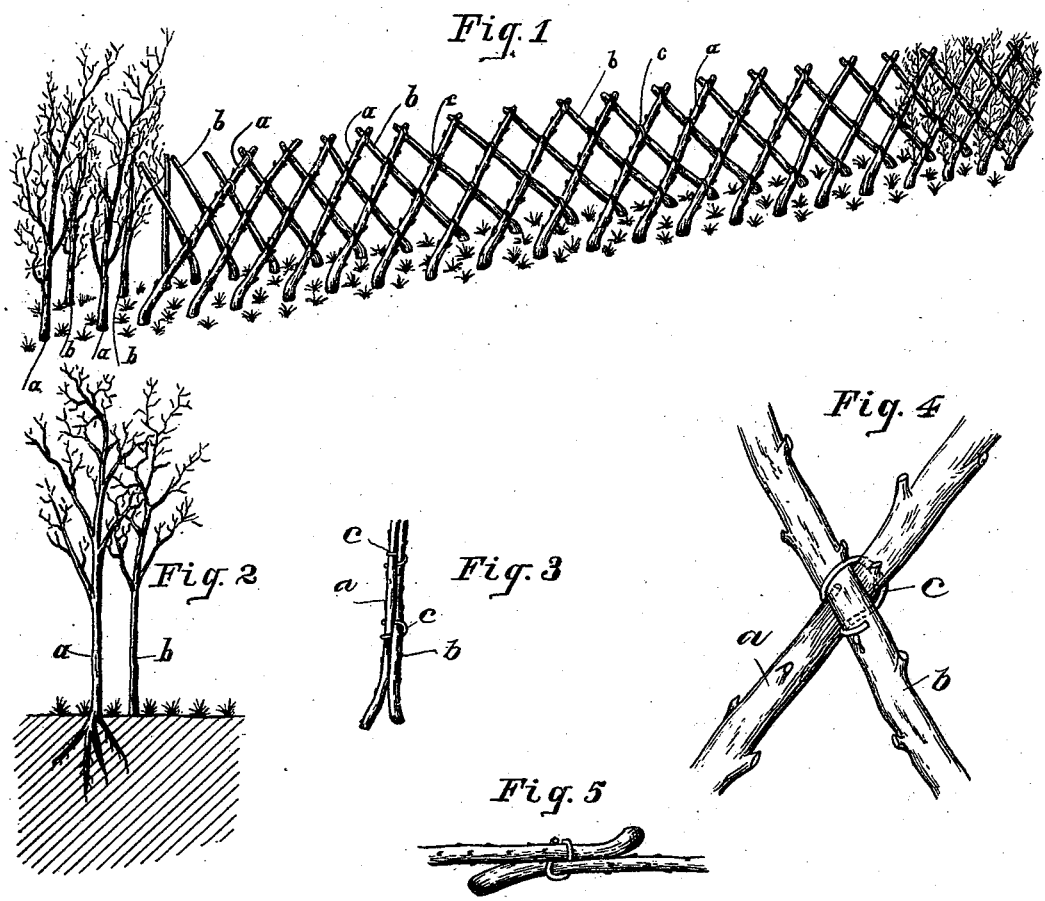
Figure 6:
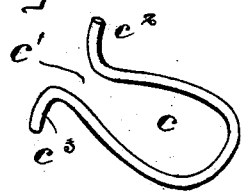
Figure 8:
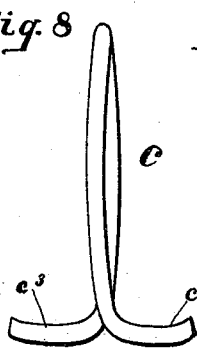
Figure 7:
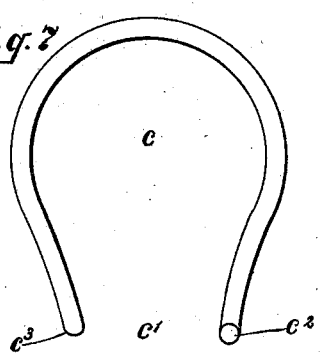

In the accompanying drawings, which form a part of this specification, Figure 1 is a perspective view illustrating a hedge fence embodying my invention. Fig. 2 is an end view of the same, showing the stalks or canes in a normal position before being bent. Fig. 3 is a similar view showing the canes bent and secured by my improved clamping-ring. Figs. 4 and 5 are respectively a side and top view of two or more intersecting canes, showing the manner of applying the clamping-ring. Fig. 6 is a persective view of the clamping-ring in detail. Figs. 7 and 8 are front and side views, respectively, of the same.

Like parts are indicated by similar letters of reference throughout the several views.

In constructing a hedge fence by this improved method I employ two rows of canes planted at regular intervals, the plants in the respective rows being preferably arranged opposite each other and at a distance of six or eight inches apart, as shown at $b$ in Figs. 1 and 2. When the plants are properly matured, the canes are trimmed in the ordinary manner and the canes $a$ in one row bent in one direction and those $b$ in the other row bent in the other direction in a position which will cause the canes in the respective rows to intersect at several points. At the point of intersection the canes will be closed together and held securely in position by my improved clamping-ring $c$, placed around the intersecting points in a vertical direction in the following manner: The clamping-ring is preferably made of a horseshoe shape, having an opening, $c'$, between the ends thereof sufficient to permit the ring to slip over the cane or stalk to be secured thereby. The respective ends $c^2$ and $c^3$ of the iron or steel which forms the ring are bent at right angles, or substantially so, to the body of the ring $c$. In securing the canes at the point of intersection the clamping-ring is slipped over one stalk and the intersecting stalk bent down until it will pass through the opening $c'$. The ring is then turned until the bent ends $c^2$ and $c^3$ come on opposite sides of the said stalk, and thus clutch or clamp the same. When the canes are released, the tendency to resume an upright position will bind the sides of ring tightly against the respective intersecting stalks, and thus hold said ring firmly in position.

It will be seen that in a fence as thus described the canes will be rigidly secured without the use of a clamping device of any kind for bending or closing the rings, the rings being all constructed prior to the time the canes or stalks are trimmed and plashed. I preferably construct the rings of several sizes to provide for canes of different thicknesses or for the different thicknesses of the same cane at the points of intersection. By the use of the clamping-ring as thus described more latitude is allowed to the plant or cane, which will permit the same to grow and increase in size without breaking the connection at the intersecting points. It also obviates the piercing of the stalks, as has heretofore been done, for the purpose of introducing clamping wires or pins.

Having thus described my invention, I claim—

1. In a hedge fence, the combination, with the canes planted in two rows, the respective canes of which rows are bent in opposite directions in the plane of the fence, so as to form a series of intersections between the said canes, of an open clamping-ring having the ends bent in opposite directions and adapted to hook round one of said canes from opposite directions while the other cane is encircled by the body of said ring, substantially as and for the purpose set forth.

2. A clamping-ring for hedge fences, substantially as described, consisting of the main body having the opening therein and the hooked ends bent in opposite directions substantially at right angles to the body of said ring, substantially as set forth.

In testimony whereof I have hereunto set my hand this 7th day of April, A. D. 1888.

ARTHUR T. CULBERTSON.

Witnesses:
W. B. McKINNEY,
THOS. B. KYLE.